United States Patent
Hammarlund et al.

(10) Patent No.: US 7,328,293 B2
(45) Date of Patent: *Feb. 5, 2008

(54) QUEUED LOCKS USING MONITOR-MEMORY WAIT

(75) Inventors: Per Hammarlund, Hillsboro, OR (US); James B. Crossland, Banks, OR (US); Anil Aggarwal, Portland, OR (US); Shivnandan D. Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/716,377

(22) Filed: Mar. 9, 2007

(65) Prior Publication Data

US 2007/0162774 A1   Jul. 12, 2007

Related U.S. Application Data

(63) Continuation of application No. 10/608,708, filed on Jun. 27, 2003, now Pat. No. 7,213,093.

(51) Int. Cl.
G06F 12/00 (2006.01)
G06F 9/46 (2006.01)
G06F 9/50 (2006.01)

(52) U.S. Cl. ............... 710/200; 718/102; 718/104; 719/315

(58) Field of Classification Search ........... 710/102, 710/104, 120, 200; 719/315; 718/102, 104
See application file for complete search history.

(56) References Cited

U.S. PATENT DOCUMENTS

| 5,274,809 | A | 12/1993 | Iwasaki et al. |
| 5,790,851 | A | 8/1998 | Frank et al. |
| 5,933,627 | A | 8/1999 | Parady |
| 6,035,374 | A | 3/2000 | Panwar et al. |
| 6,493,741 | B1 | 12/2002 | Emer et al. |
| 7,127,561 | B2 | 10/2006 | Hill |
| 7,213,093 | B2 * | 5/2007 | Hammarlund et al. ...... 710/200 |
| 2003/0126186 | A1 | 7/2003 | Rodgers et al. |
| 2003/0126379 | A1 | 7/2003 | Kaushik |

(Continued)

FOREIGN PATENT DOCUMENTS

DE   10297596   12/2004

(Continued)

OTHER PUBLICATIONS

PCT Search Report, PCT/US2004/019373, international filing date Jun. 16, 2004, Applicant Intel Corporation, Mailing Date Oct. 5, 2005.

(Continued)

*Primary Examiner*—Paul R. Myers
*Assistant Examiner*—Jeremy S Cerullo
(74) *Attorney, Agent, or Firm*—Blakely, Sokoloff, Taylor & Zafman LLP

(57) ABSTRACT

A method, apparatus, and system are provided for monitoring locks using monitor-memory wait. According to one embodiment, a node associated with a contended lock is monitored; and a processor seeking the contended lock is put to sleep until a monitor event occurs.

21 Claims, 11 Drawing Sheets

U.S. PATENT DOCUMENTS

2003/0126416 A1 7/2003 Marr
2003/0163642 A1 8/2003 Borkenhagen et al.
2003/0236816 A1 12/2003 Venkatasubramanian

FOREIGN PATENT DOCUMENTS

| EP | 0361176 | 4/1990 |
|---|---|---|
| EP | 0827071 | 4/1998 |
| WO | WO 98/43193 | 10/1998 |
| WO | WO03/058447 | 7/2003 |

OTHER PUBLICATIONS

Mendelson, et al.,; "Design Alternatives of Multithreaded Architecture", International Journal of Parallel Programming, vol. 27, No. 3, 161-193, 1999.

* cited by examiner

QUEUED LOCKS USING MONITOR-MEMORY WAIT

RELATED APPLICATION

This application is a Continuation application of U.S. application Ser. No. 10/608,708, filed on Jun. 27, 2003, and priority is claimed thereof.

BACKGROUND OF THE INVENTION

1. Field of the Invention

This invention relates to processors and more particularly to, using monitor-memory wait for monitoring a lock for one or more processors waiting for the lock until the lock become available.

2. Description of Related Art

Typically, a hyperthreaded or multi-threaded processor is capable of processing multiple instruction sequences concurrently. A primary motivating factor driving execution of multiple instruction streams within a single processor is the resulting improvement in processor utilization. Hyperthreaded processors allow multiple instruction streams to execute concurrently in different execution resources in an attempt to better utilize those resources. Furthermore, hyperthreaded processors can be used for programs that encounter high latency delays or which often wait for events to occur.

Typically, hyperthreaded processors have a single resource setup that is to be shared by all threads or logical processors (processors). Not having adequate resources may result in significant contention between processors, particularly when one or more processors wait for a lock to become available. Several techniques have been proposed to improve program operation inefficiency and other resource-consuming delays dealing with lock contention between multiple processors. For example, in a conventional spin-wait locks system, a waiting queue is used to put the processor waiting for the lock on the waiting list to wait until the lock becomes available. However, during such waiting, the processor continuously accesses the memory location of the lock, causing the memory contention on that memory location, bottlenecking of resources, waste of memory bandwidth, compute bandwidth, microarchitectural resources, and power. Such "busy waiting" processors can have adverse effect on the performance of other processors in the pact.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
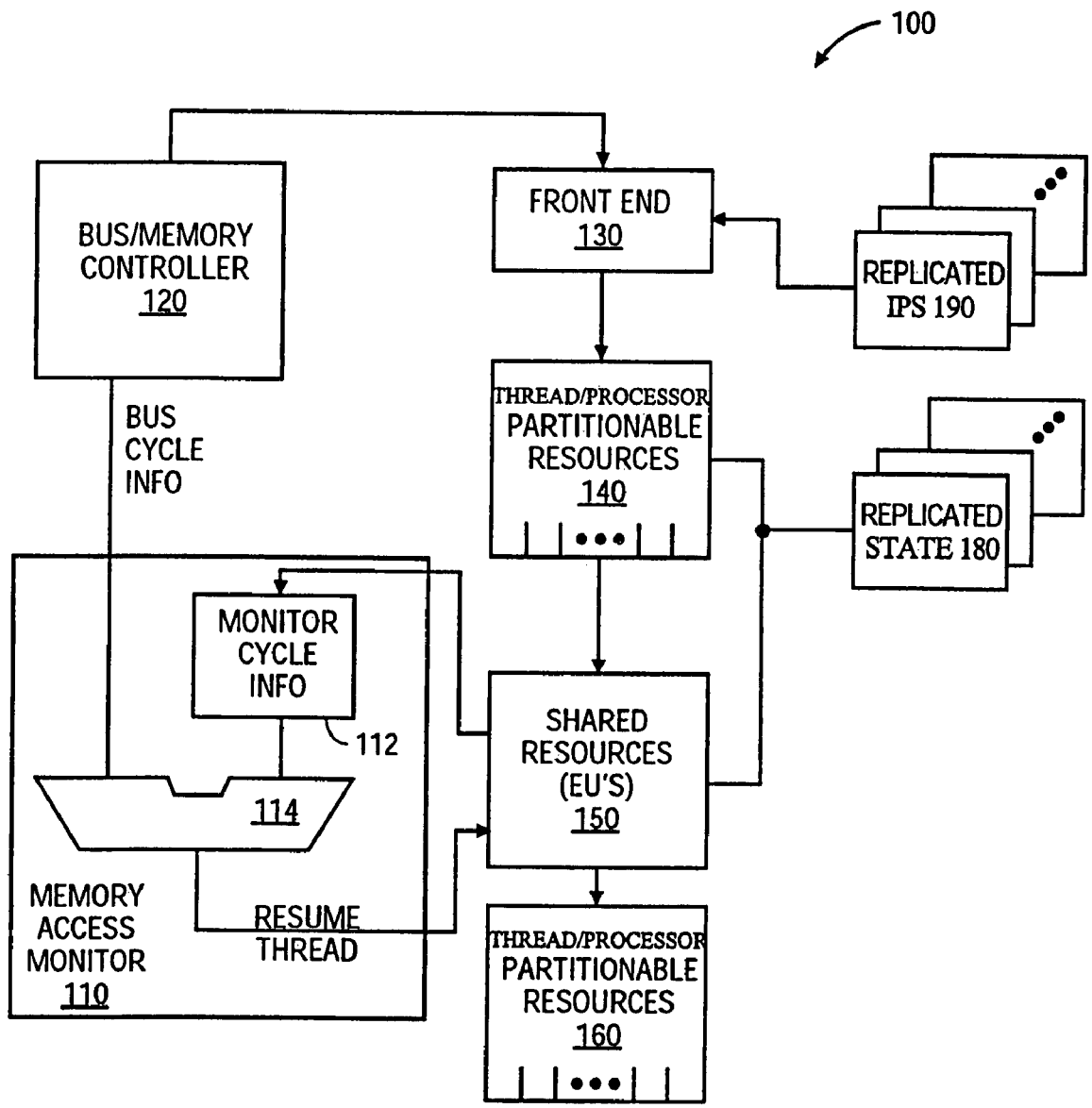
FIG. 1 is a block diagram illustrating an embodiment of a hyperthreaded processor having a memory access monitor.

A method and apparatus are described for monitoring a lock for one or more processor waiting for the lock. Broadly stated, embodiments of the present invention provide for using monitor-memory mwait for monitoring a lock for one or more processors waiting for the lock until the lock becomes available.

A system, apparatus, and method are provided for putting to sleep a processor to acquire a lock that may be contended by other processors, until a monitor event occurs, such as the lock becomes available to the processor. Stated differently, although the processor may be waiting for the lock to become available, it may sleep while waiting in a queue. According to one embodiment, the option of the processor sleeping may include the processor relinquishing its resources and providing the relinquished resources to be used by other processors. According to one embodiment, the processor seeking the lock may be a logical processor of a hyperthreaded processor. A typical hyperthreaded processor may include multiple threads or logical processors sharing the same resource.

According to one embodiment, the monitor-memory wait (monitor-mwait) mechanism may be used to monitor the contended lock and to put the processor to sleep until, for example, the lock becomes available. The contended lock may refer to a lock that one or more processors wait or seek to acquire. According to one embodiment, a node or queue element (node) may be generated corresponding to the processor. According to one embodiment, the node may be initialized, associated with the contended lock, and monitored, using monitor-mwait. The monitoring of the node may include monitoring the lock by, for example, monitoring the lock address of the lock which may be referred to as monitor address.

According to one embodiment, one or more events, or a set time period, may be referred to as monitor events, and upon the occurrence of a monitor event, the monitoring of the node may end and the processor may be awakened. For example, having the processor next in the queue to claim the lock and the availability of the lock may be referred to as a monitor event. Stated differently, when the processor is next (or first) in line to receive the contended lock and the lock becomes available, the processor may claim the lock and may also reclaim some or all of the previously relinquished resources. According to one embodiment, the contended lock may become available when released by another processor owning the lock.

According to one embodiment, monitor-mwait may be implemented in one thread or processor while letting other processors use processing resources. For example, according to one embodiment, a monitor may be set up such that a processor may sleep until a particular memory access, such as a write to a specified memory location, occurs. A processor may be awakened upon a specified event without executing routines that may waste processor resources. According to one embodiment, partitions previously dedicated to the now sleeping processor may be relinquished while the processor is still sleeping. These and/or other embodiments of the present invention may relatively improve the overall machine throughput.

In the following description, numerous specific details such as logic implementations, opcodes, resource partitioning, resource sharing, and resource duplication implementations, types and interrelationships of system components, and logic partitioning/integration choices are set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various steps of the embodiments of the present invention will be described below. The various steps of the embodiments may be performed by hardware components or may be embodied in machine-executable instructions, which may be used to cause a general-purpose or special-purpose processor or a machine or logic circuits programmed with the instructions to perform the various steps. Alternatively, the various steps of the embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of a hyperthreaded processor 100 having a memory access monitor 110. According to one embodiment a processor 100 may be formed as a single integrated circuit. According to another embodiment, multiple integrated circuits may together form a processor 100, and according to yet another embodiment, hardware and software routines (e.g., binary translation routines) may together form the processor 100. As illustrated, a bus/memory controller 120 may provide instructions for execution to a front end 130. The front end 130 may direct the retrieval of instructions from various threads according to instruction pointers 170. Instruction pointer logic may be replicated to support multiple threads.

According to one embodiment, the front end 130 may feed instructions into thread/processor partitionable resources 140 for further processing. The thread/processor partitionable resources 140 may include logically separated partitions dedicated to particular threads when multiple threads are active within the processor 100. According to one embodiment, each separate partition may only contain instructions from the thread to which that portion is dedicated. The thread/processor partitionable resources 140 may include, for example, instruction queues. When in a single thread mode, the partitions of the thread/processor partitionable resources 140 may be combined to form a single large partition dedicated to the one thread.

According to one embodiment, the processor 100 may also include replicated state 180. The replicated state 180 may include state variables sufficient to maintain context for a logical processor. With replicated state 180, multiple threads may execute without competition for state variable storage. Additionally, register allocation logic may be replicated for each thread. The replicated state-related logic may operate with the appropriate resource partitions to prepare incoming instructions for execution.

According to one embodiment, the thread/processor partitionable resources 140 may pass instructions along to shared resources 150. The shared resources 150 may operate on instructions without regard to their origin. For example, scheduler and execution units may be thread-unaware shared resources. The partitionable resources 140 may feed instructions from multiple threads to the shared resources 150 by alternating between the threads in a fair manner that provides continued progress on each active thread. Thus, the shared resources 150 may execute the provided instructions on the appropriate state without concern for the thread mix.

According to one embodiment, the shared resources 150 may be followed by another set of thread/processor partitionable resources 160. The thread/processor partitionable resources 160 may include retirement resources, such as a re-order buffer. Accordingly, the thread/processor partitionable resources 160 may ensure that execution of instructions from each thread concludes properly and that the appropriate state for that thread is appropriately updated.

According to one embodiment, programmers may be provided with a mechanism to implement the functionality of monitor-memory wait without requiring constant polling of a memory location or even execution of instructions. For example, the processor 100 may include a memory access monitor 110. The memory access monitor 110 may be programmable with information about a memory access cycle for which the memory access monitor 110 may be enabled to watch. Accordingly, the memory access monitor 110 may include a monitor cycle information register 112, which is compared against bus cycle information received from the bus/memory controller 120 by comparison logic 114. If a match occurs, a resume thread signal may be generated to re-start a suspended thread. Memory access information may be obtained from internal and/or external buses of the processor.

The monitor cycle information register 112 may contain details specifying the type of cycle and/or the address which may trigger the resumption of a thread. According to one embodiment, the monitor cycle information register 112 may store a physical address, and the memory access monitor 110 may watch for any bus cycle that indicates an actual or potential write to that physical address. Such a cycle may be in the form of an explicit write cycle and/or may be a read for ownership or an invalidating cycle by another agent attempting to take exclusive ownership of a cacheable line so that it may write to that line without an external bus transaction. The memory access monitor 110 may be programmed to trigger on various transactions in different embodiments.

Figure 2:
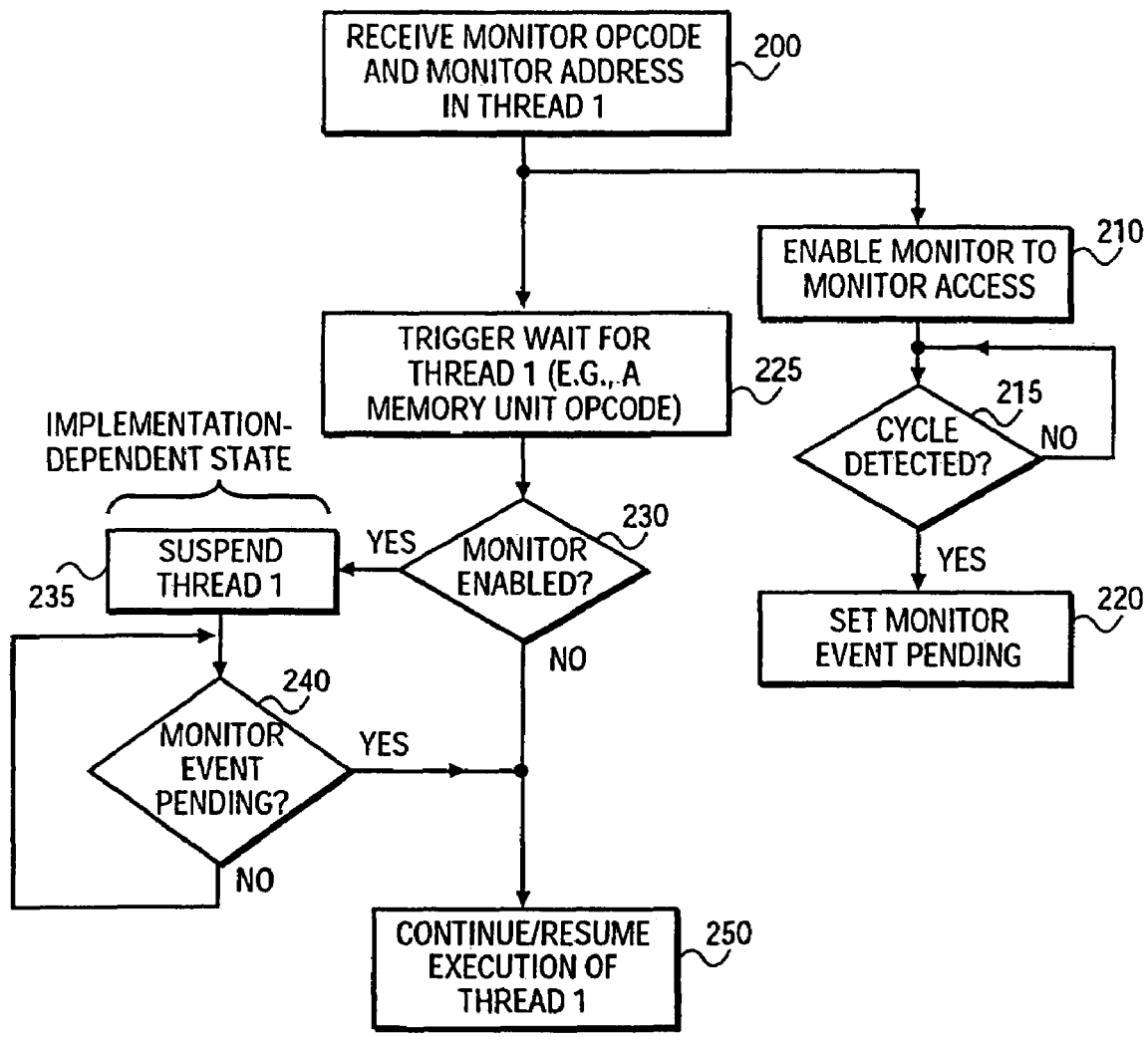
FIG. 2 is a flow diagram illustrating an embodiment of an operation of a hyperthreaded processor.

FIG. 2 is a flow diagram illustrating an embodiment of an operation of a hyperthreaded processor. The operations of the various embodiments of FIG. 1 may be further explained with reference to the flow diagram of FIG. 2. According to one embodiment, the instruction set of the processor 100 may include a MONITOR opcode (instruction) to set up the monitor transaction information. At processing block 200, the MONITOR opcode is received as a part of the sequence of instructions of a first thread (T1). At processing block 210, in response to the MONITOR opcode, the processor 100 enables the memory access monitor 110 to monitor memory accesses for the specified memory access. The triggering memory access may be specified by an implicit or explicit operand. Therefore, executing the MONITOR opcode may specify the monitor address as the monitor address may be stored in advance in a register or other location as an implicit operand. The memory access monitor 110 may test whether the specified cycle is detected at decision block 215. If the specified cycle is not detected, the memory access monitor 110 may continue monitoring memory accesses. If the triggering cycle is detected, then a monitor event pending indicator may be set at processing block 220.

According to one embodiment, the execution of the MONITOR opcode may trigger activation of the memory access monitor 110. The memory access monitor 110 may begin to operate in parallel with other operations in the processor 100. According to one embodiment, the MONITOR instruction itself may only set up the memory access monitor 110 with the proper memory cycle information and activate the memory access monitor 110, without unmasking monitor events. Stated differently, after the execution of the MONITOR opcode, monitor events may accrue, but may not be recognized unless they are explicitly unmasked.

At processing block 225, triggering of a memory wait (mwait) is illustrated as a separate event. According to one embodiment, a MWAIT opcode may be used to trigger the recognition of monitor events and the suspension of T1. Using two separate instructions to set up and trigger the thread suspension may provide a programmer the added flexibility and allow more efficient programming. According to another embodiment, mwait may be triggered from the first opcode which may also set up the memory access monitor 110. In either case, one or more instructions may arm the memory access monitor 110 and enable recognition of monitor events.

According to one embodiment, where separate opcodes are used to arm the memory access monitor 110 and to trigger the recognition of monitor events, a test may be performed to ensure that the memory access monitor 110 has been activated before suspending the thread at decision block 230. Furthermore, by testing if a monitor event is already pending (not illustrated), suspension of T1 may be avoided, and operation may continue at processing block 250. If the monitor 110 has been enabled and no monitor events are already pending, T1 may be suspended at processing block 235.

With T1 suspended, according to one embodiment, the processor 100 may enter an implementation dependent state which may allow other threads to more fully utilize the processor resources. According to one embodiment, the processor may relinquish some or all of the partitions of partitionable resources 140 and 160 that were dedicated to T1. According to another embodiment, different permutations of the MONITOR opcode or settings associated therewith may indicate which resources to relinquish, if any. For example, when a programmer anticipates a shorter wait, the thread may be suspended, but maintain its resource partitions. Throughput may still be enhanced because the shared resources may be used exclusively by other threads during the thread suspension period. When a longer wait is anticipated, relinquishing all partitions associated with the suspended thread may allow other threads to have additional resources, potentially increasing the throughput of the other threads. The additional throughput may come at the cost of the overhead associated with removing and adding partitions when threads are respectively suspended and resumed.

According to one embodiment, T1 may remain in a suspended state until a monitor event is pending. As previously discussed, the memory access monitor 110 may operate independently to detect and signal monitor events (blocks 215-220). If the processor 100 detects that a monitor event is pending at decision block 240, then T1 may be resumed at processing block 250. No active processing of instructions in T1 may need to occur for the monitor event to wake up T1; rather, T1 may remain suspended and the enabled memory access monitor 110 may signal an event to the processor 110. The processor 100 may handle the event and recognize that the event indicating T1 should be resumed, and performs the appropriate actions to resume T1.

The embodiments of FIGS. 1 and 2 may provide techniques to allow a thread suspended by a program to be resumed upon the occurrence of a specified memory access. According to one embodiment, other events may also cause T1 to be resumed. For example, an interrupt may cause T1 to resume. Such an implementation may allow the memory access monitor 110 to be less than perfect in that it may miss (not detect) certain memory accesses or other conditions that should cause the thread to resume. As a result, T1 may be awakened unnecessarily at times. However, such an implementation reduces the likelihood that T1 will become permanently frozen due to a missed event, simplifying hardware design and validation. The unnecessary awakenings of T1 may be only a minor inconvenience as a loop may be constructed to have T1 double-check whether the condition it was awaiting truly did occur, and if not to suspend itself once again.

According to one embodiment, the thread/processor partitionable resources, the replicated resources, and the shared resources may be arranged differently. In some embodiments, there may not be partitionable resources on both ends of the shared resources. According to one embodiment, the thread/processor partitionable resources may not be strictly partitioned, but rather may allow some instructions to cross partitions or may allow partitions to vary in size depending on the thread being executed in that partition or the total number of threads being executed. Additionally, different mixes of resources may be designated as shared, duplicated, and thread partitioned resources.

Figure 3:
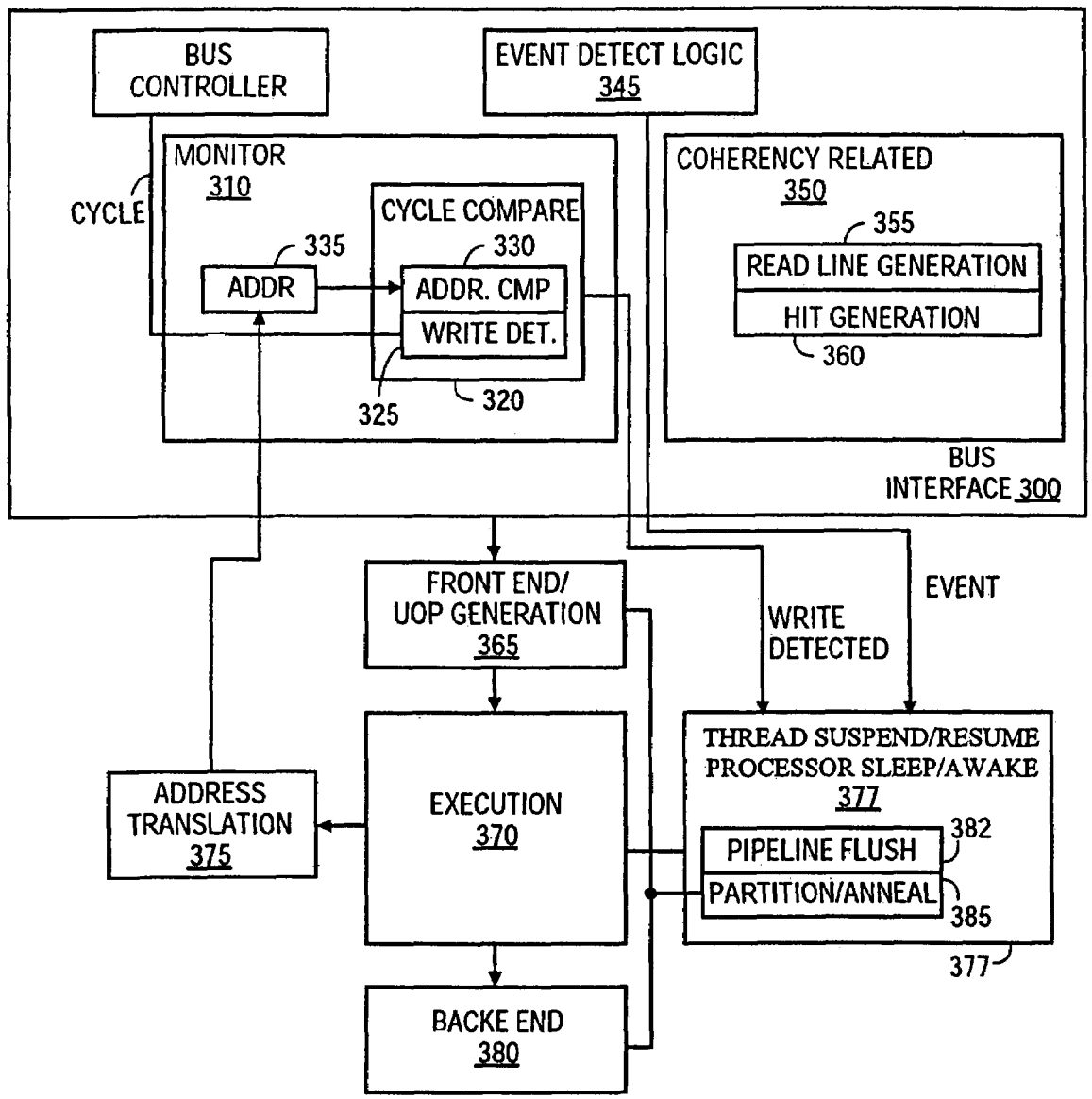
FIG. 3 is a block diagram illustrating an embodiment of a hyperthreaded processor.

FIG. 3 is a block diagram illustrating an embodiment of a hyperthreaded processor. As illustrated, according to one embodiment, FIG. 3 includes coherency related logic 350, one implementation of a monitor 310, and one specific implementation of thread suspend/resume and processor sleep/awake logic 377, among other components. According to one embodiment, a bus interface 300 includes a bus controller 340, event detect logic 345, a monitor 310, and the coherency related logic 350.

According to one embodiment, the bus interface 300 may provide instructions to a front end 365, which performs micro-operand (uOP) generation, generating uOPs from macroinstructions. Execution resources 370 may receive uOPs from the front end 365, and back end logic 380 may retire various uOPs after they are executed. According to one embodiment, out-of-order execution may be supported by the front end, back end, and execution resources.

According to one embodiment, a MONITOR opcode may enter the processor through the bus interface 300 and be prepared for execution by the front end 365. According to one embodiment, a special MONITOR uOP may be generated for execution by the execution resources 370. The MONITOR uOP may be treated similarly to a store operation by the execution units, with the monitor address being translated by address translation logic 375 into a physical address, which may be provided to the monitor 310. The monitor 310 may communicate with thread suspend/resume and processor sleep/awake logic 377 to cause resumption of threads. The thread may suspend and resume logic may perform partition and anneal resources as the number of active threads changes.

Figure 4:
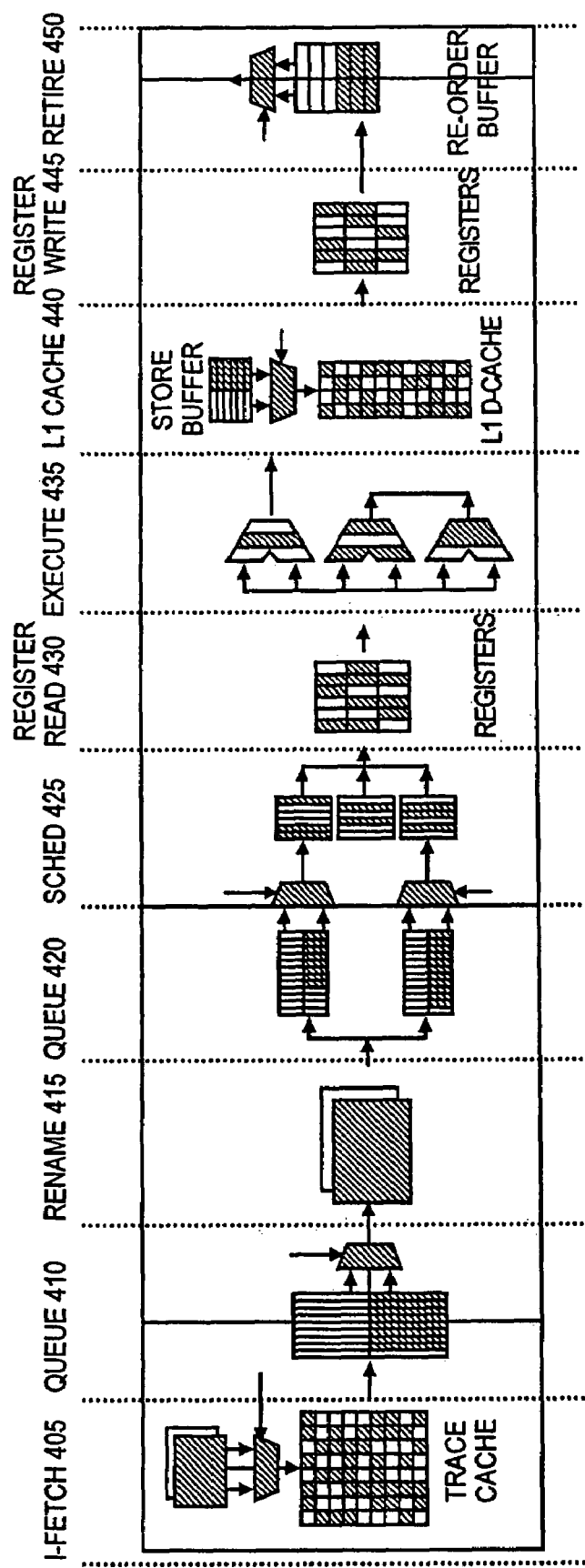
FIG. 4 is a block diagram illustrating an embodiment of a process for partitioning, sharing, and duplicating of resources.

For example, FIG. 4 is a block diagram illustrating an embodiment of a process for partitioning, sharing, and duplicating of resources. According to one embodiment, partitioned resources may be partitioned and annealed (fused back together for re-use by other threads) according to the flow of active threads in the machine. According to one embodiment, duplicated resources may include instruction pointer logic in the instruction fetch portion 405 of the pipeline, register renaming logic in the rename portion 415 of the pipeline, state variables (not illustrated), and an interrupt controller (not illustrated). Shared resources, according to one embodiment, may include schedulers in the schedule stage 425 of the pipeline, a pool of registers in the register read 430 and register write portions 445 of the pipeline, execution resources in the execute portion 435 of the pipeline. Additionally, a trace cache (in I-fetch 405) and an L1 data cache (in L1 cache 440) may be shared resources populated according to memory accesses without regard to thread context. According to another embodiment, consideration of thread context may be used in caching decisions. Partitioned resources, according to one embodiment, may include two queues in queuing stages 410 of the pipeline, a re-order buffer in a retirement stage 450 of the pipeline, and a store buffer. Thread selection multiplexing logic may alternate between various duplicated and partitioned resources to provide reasonable access to both threads.

For exemplary purposes, it is assumed that the partitioning, sharing, and duplicating, as illustrated in FIG. 4, may be utilized in conjunction with the embodiment of FIG. 3 in further describing operation of an embodiment of the processor of FIG. 3. In particular, further details of operation of the embodiment of FIG. 3 will now be discussed with respect to the flow diagram of FIG. 5. The processor is assumed to be executing in a multi-threading mode, with at least two threads active.

Figure 5:
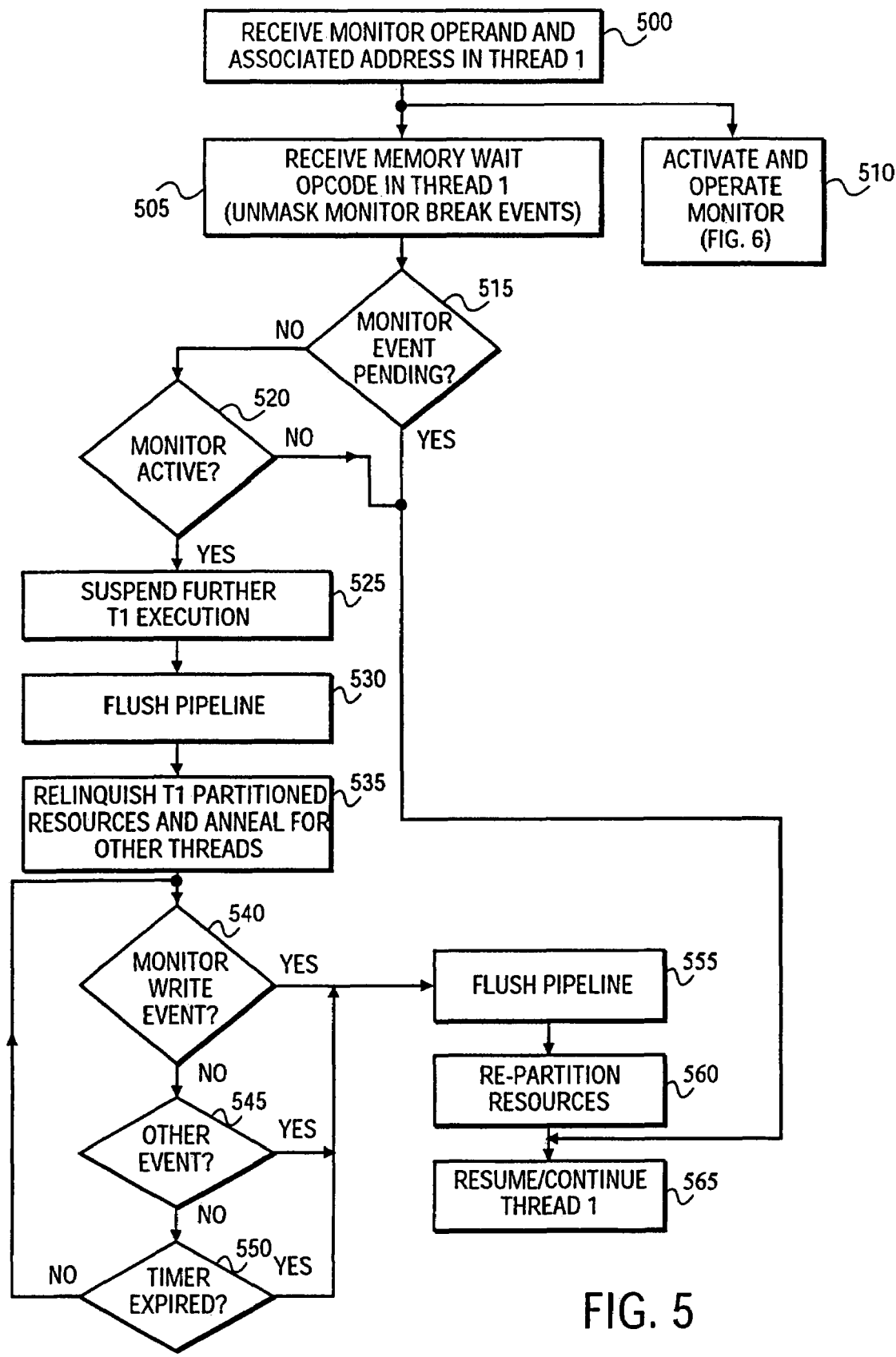
FIG. 5 is a flow diagram illustrating an embodiment of a process for suspending and resuming execution of a thread.

FIG. 5 is a flow diagram illustrating an embodiment of a process for suspending and resuming execution of a thread. At processing block 500, the front end 365 may receive a MONITOR opcode during execution of a first thread (T1). The front end 365, according to one embodiment, may generate a special monitor uOP. The MONITOR uOP may be passed to the execution resources 370. The monitor uOP may have an associated address indicating the address to be monitored (the monitor address). The associated address may be in the form of an explicit operand or an implicit operand (i.e., the associated address is to be taken from a predetermined register or other storage location). The associated address may "indicate" the monitor address in that it conveys enough information to determine the monitor address (possibly in conjunction with other registers or information). For example, the associated address may be a linear address having a corresponding physical address that may be the appropriate monitor address. Alternatively, the monitor address may be given in virtual address format, or could be indicated as a relative address, or specified in other known or convenient address-specifying manners. If virtual address operands are used, it may be desirable to allow general protection faults to be recognized as break events.

The monitor address may indicate any convenient unit of memory for monitoring. For example, according to one embodiment, the monitor address may indicate a cache line. However, according to another embodiment, the monitor address may indicate a portion of a cache line, a specific/selected size portion or unit of memory, which may bear different relationships to the cache line sizes of different processors, or a singe address. The monitor address may indicate a unit that includes data specified by the operand (and more data) or may indicate specifically an address for a desired unit of data.

Using the illustration of FIG. 3, according to one embodiment, the monitor address may be provided to the address translation logic 375 and passed along to the monitor 310, where it may be stored in a monitor address register 335. In response to the MONITOR opcode, the execution resources 370 may then enable and activate the monitor 310 as indicated in processing block 510 and further detailed in FIG. 6. According to one embodiment, any store operations that occur after the MONITOR opcode may be fenced to ensure that stores may be processed and therefore detected before any thread suspension occurs. According to one embodiment, some operations may need to occur as a result of activating the monitor 310 before any subsequent instructions can be undertaken. However, processing block 510 is shown as occurring in parallel with processing block 505 because the monitor 310 may continue to operate in parallel with other operations until a break event occurs once it is activated by the MONITOR opcode according to one embodiment.

At processing block 505, a MEMORY WAIT (MWAIT) opcode may be received in thread 1. According to one embodiment, MWAIT opcode may be executed for unmasking monitor events. In response to the MWAIT opcode, a test may be performed at processing block 515 to determine whether a monitor event is pending. If no monitor event is pending, then a test may be performed at processing block 520 to determine whether the monitor is active. For example, if MWAIT is executed without previously executing a MONITOR, the monitor 310 may not be active. If either the monitor is inactive or a monitor event is pending, then thread 1 execution may be continued at processing block 565.

According to one embodiment, if the monitor 310 is active and no monitor event is pending, then thread 1 execution may be suspended at processing block 525. The thread suspend/resume logic 377 may include pipeline flush logic 382 to drain the processor pipeline in order to clear all instructions at processing block 530. Once the pipeline has been drained, partition/anneal logic 385 may cause any partitioned resources associated exclusively with thread 1 to be relinquished for use by other threads at processing block 535. These relinquished resources may be annealed to form a set of larger resources for the remaining active threads to utilize. For example, referring to the two-thread example of FIG. 4, all instructions related to thread 1 might be drained from both queues. Each pair of queues may then be combined to provide a larger queue to the second thread. Similarly, more registers from the register pool may be made available to the second thread, more entries from the store buffer may be freed for the second thread, and more entries in the re-order buffer may be made available to the second thread. In essence, these structures are returned to single dedicated structures of twice the size. Different proportions resulting from implementations using different numbers of threads are contemplated.

According to one embodiment, at processing blocks 540, 545, and 550, various events are tested to determine whether thread 1 may be resumed. Notably, these tests may not be performed by instructions being executed as a part of thread 1. Rather, these operations may be performed by the processor in parallel to its processing of other threads. As will be discussed in further detail with respect to FIG. 6, the monitor itself may check whether a monitor write event has occurred and so indicates by setting an event pending indicator. The event pending indicator may be provided via an EVENT signal to the suspend/resume logic 377 (e.g., microcode). Microcode may recognize the monitor event at an appropriate instruction boundary in one embodiment (block 540) since this event was unmasked by the MWAIT opcode at processing block 505. Event detect logic 345 may detect other events, such as interrupts, that are designated as break events at processing block 545. Additionally, according to one embodiment, an optional timer may be used periodically to exit the memory wait state to ensure that the processor does not become frozen due to some particular sequence of events at processing block 550. If none of these events signal an exit to the mwait state, then thread 1 may remain suspended.

If thread 1 is resumed, according to one embodiment, the thread/suspend resume logic 377 may again be activated upon detection of the appropriate event. Again, the pipeline may flushed at processing block 555 to drain instructions from the pipeline so that resources can be once again partitioned to accommodate the soon-to-be-awakened thread 1. At processing block 560, the appropriate resources may be re-partitioned, and thread 1 may resumed at processing block 565.

Figure 6:
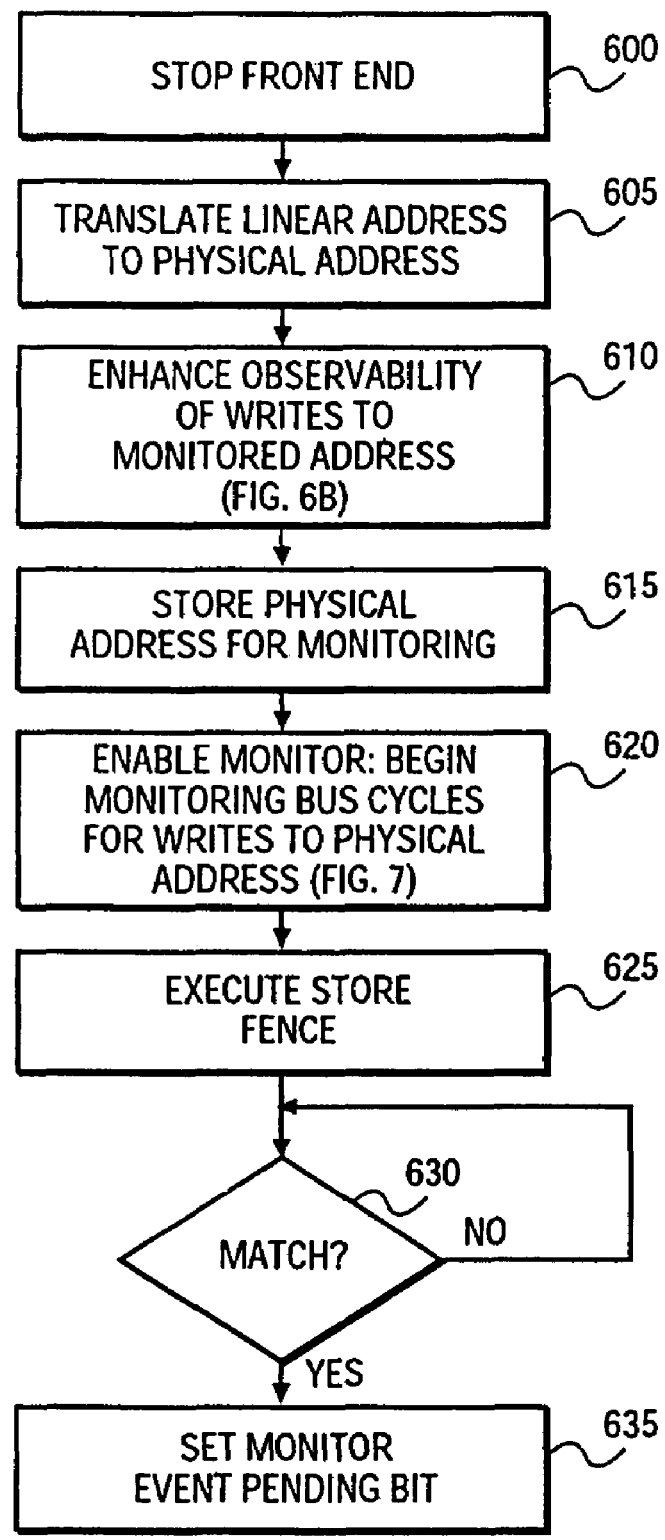
FIG. 6 is a flow diagram illustrating an embodiment of a process for activation and operation of monitoring logic.

FIG. 6 is a flow diagram illustrating an embodiment of a process for activation and operation of monitoring logic. At processing block 600, front end fetching for thread 1 may be stopped to prevent further thread 1 operations from entering the machine. At processing block 605, associated address operand may be converted from being a linear address to a physical address by the address translation logic 375. At processing block 610, observability of writes to the monitored address may be increased, perhaps to force caching agents to make write operations which would affect the information stored at the monitor address visible to the monitor 310 itself. At processing block 615, physical address for monitoring may be stored earlier or later in this sequence.

Next, according to one embodiment, at processing block 620, the monitor may be enabled. The monitor monitors bus may cycle for writes to the physical address which may be the monitor address stored in the monitor address register 335. Further details of the monitoring operation are discussed below with respect to FIG. 7. After the monitor is enabled, according to one embodiment, a store fence operation may be executed at processing block 625. The store fence may help ensure that all stores in the machine are processed at the time the MONITOR opcode completes execution. With all stores from before the monitor being drained from the machine, the likelihood that a memory wait (mwait) state is entered erroneously may be reduced. The store fence operation may serve as a precaution, and may be a time consuming operation.

The store fence may be optional because the monitor-mwait mechanism, according to one embodiment, may be designed as a multiple exit mechanism. Stated differently, various events such as certain interrupts, recognitions, system on board timers, etc., may also cause exit from the mwait state. According to one embodiment, the thread may be awakened because the data value being monitored has changed. Accordingly, according to one embodiment, software may double-check whether the particular value stored in the memory has changed. According to one embodiment, certain events including assertion NonMaskable Interrupt (NMI) and System Management Interrupt (SMI), machine check interrupts, and faults may be considered break events, and others events, such as powerdown events may not. According to one embodiment, for example, assertion of an A20M pin may also be regarded as a break event.

At processing block 630, according to one embodiment, the monitor may continue to test whether bus cycles occurring indicate or appear to indicate a write to the monitor address. If such a bus cycle is detected, the monitor event pending indicator may be set at processing block 635. After execution of the MWAIT opcode (block 505, FIG. 5), this event pending indicator may be serviced as an event and cause thread resumption in blocks 555-565 of FIG. 5. Furthermore, events that change address translation may cause thread 1 to resume. For example, events that cause a translation look-aside buffer to be flushed may trigger resumption of thread 1 since the translation made to generate the monitor address from a linear to a physical address may no longer be valid. For example, in an x86 Intel Architecture compatible processor, writes to control registers CR0, CR3, and CR4, as well as to certain machine specific registers, may cause exit of the mwait state.

Figure 7:
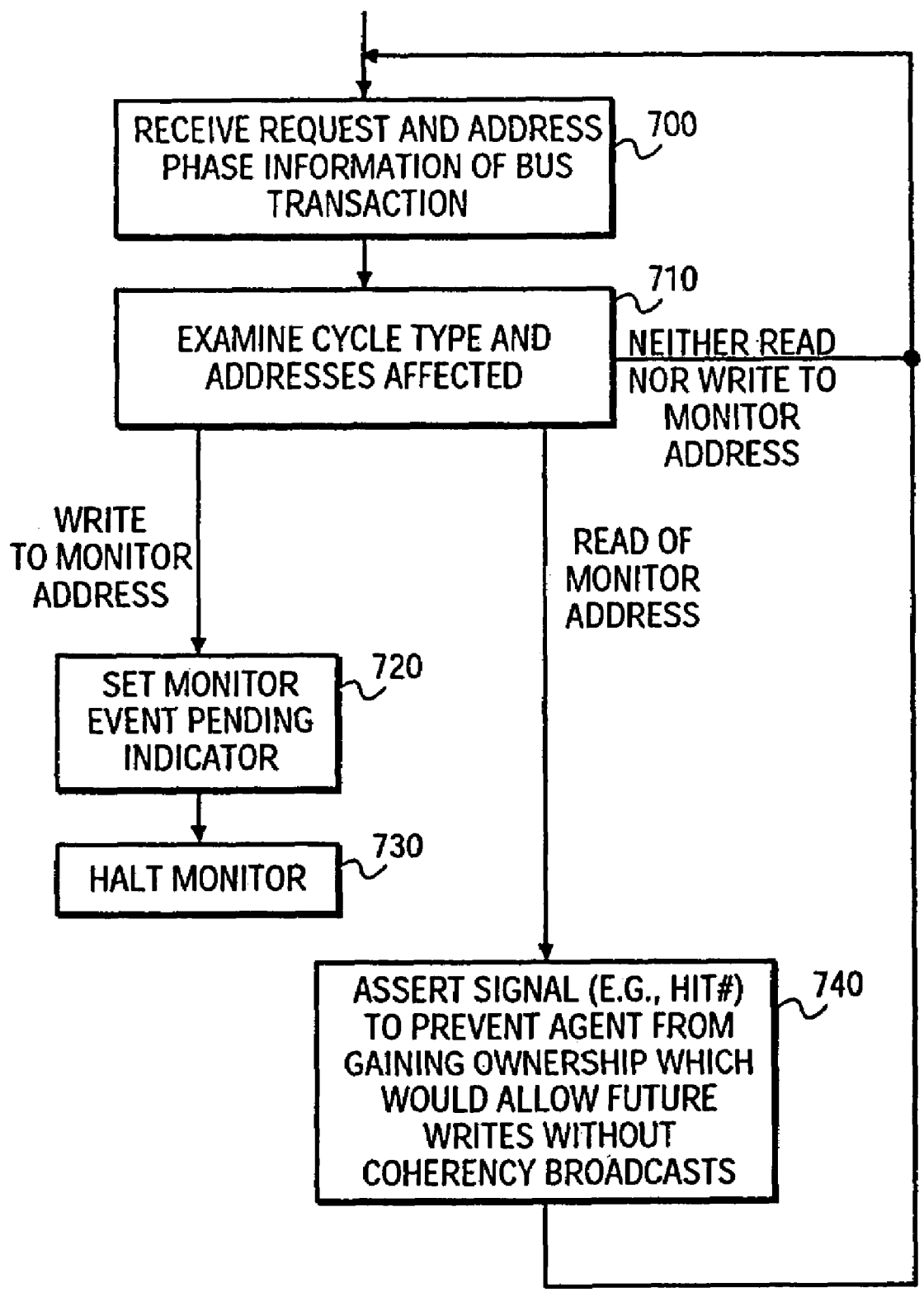
FIG. 7 is a flow diagram illustrating an embodiment of a process for monitor operations.

FIG. 7 is a flow diagram illustrating an embodiment of a process for handling monitor operations. In particular, FIG. 7 illustrates further details of operation of the monitor 310 of FIG. 3 and of the processing block 620 of FIG. 6. According to one embodiment, at processing block 700, the monitor 310 may receive request and address information from a bus controller 340 for a bus transaction. At processing block 710, the monitor 310 may examine the bus cycle type and the address(es) affected. In particular, cycle compare logic 320 may determine whether the bus cycle is a specified cycle. According to one embodiment, an address comparison circuit 330 may compare the bus transaction address to the monitor address stored in the monitor address register 335, and write detect logic 325 may decode the cycle type information from the bus controller 340 to detect whether a write has occurred. If a write to the monitor address occurs, a monitor event pending indicator may be set at processing block 720. A signal (WRITE DETECTED) may be provided to the thread suspend/resume logic 377 to signal the event (and will be serviced assuming it has been enabled by executing MEMORY WAIT (MWAIT)). Finally, the monitor 310 may be halted at processing block 730. Halting the monitor may save power, but may not be critical as long as false monitor events are masked or otherwise not generated. The monitor event indicator may also be reset at this point. Typically, servicing the monitor event may also mask the recognition of further monitor events until MWAIT may be again executed.

In case of a read to the monitor address, according to one embodiment, the coherency related logic 350 may be activated. At processing block 740, a signal (such as HIT#) may be asserted to prevent another agent from gaining ownership which may allow future writes without coherency broadcasts. According to one embodiment, the monitor 310 may remain active and return to processing block 700 and may stay unaffected by a read of the monitor address. Furthermore, if a transaction is neither a read nor a write to the monitor address, the monitor may remain active and return to processing block 700.

According to one embodiment, the MONITOR instruction may be for certain types of accesses to be monitored. These accesses may be ones chosen as indicative of efficient programming techniques, or may be chosen for other reasons. For example, according to one embodiment, memory access must be a cacheable store in write-back memory that is naturally aligned. A naturally aligned element may refer to an N bit element that starts at an address divisible by N. As a result of using naturally aligned elements, a single cache line may need to be accessed (rather than two cache lines as may be needed in the case where data is split across two cache lines) in order to write to the monitored address. Thus, using naturally aligned memory addresses may simplify bus watching.

Figure 8:
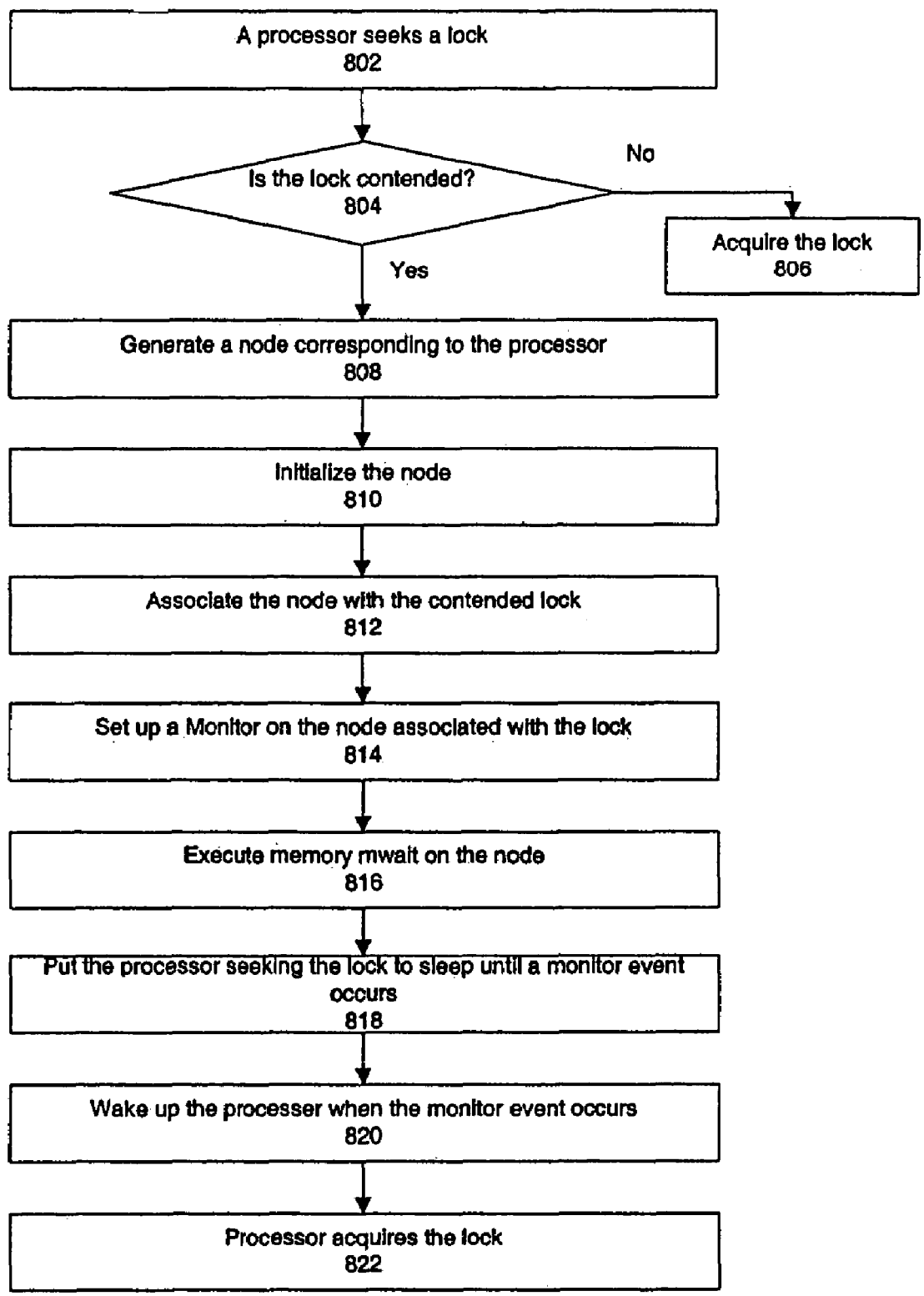
FIG. 8 is a flow diagram illustrating an embodiment of a process for acquiring a lock and monitoring the lock using monitor-memory wait.

FIG. 8 is a flow diagram illustrating an embodiment of a process for acquiring a lock and monitoring the lock using monitor-memory wait. A typical hyperthreaded or multi-threaded processor may include multiple threads or multiple logical processors (processors). Typically, multiple processors give the appearance of separate physical processors and share the same resources. At processing block 802, a processor may seek to acquire a lock, which may be contended by other processors. At decision block 804, whether the lock that the processor is seeking to acquire is contended by another processor is determined. A contended lock may refer to a lock that one or more processors wait to acquire. If the lock is not contended, the processor may acquire the lock using the conventional way of acquiring locks by claiming the ownership of the available lock at processing block 806.

Typically, if a lock is contended by one or more processors, a waiting queue may be formed to include the processors seeking the contended lock to wait. However, such waiting of the processors is typically "busy waiting" as the waiting processors use the resources available to them to, for example, access the memory location of the contended lock. At processing block 808, according to one embodiment, if the lock is contended, a queue element or node (node), such as node N, may be created for the processor. According to one embodiment, the node may then be initialized at processing block 810. According to another embodiment, the initialization of the node may not be necessary, as the node may already be initialized. At processing block 812, the initialized node may then be linked or associated with the contended lock. According to one embodiment, once associated, the node may then serve as a tail pointer for the contended lock.

According to one embodiment, at processing block 814, a monitor may be set up on the node to monitor the node associated with the contended lock to monitor the contended lock. The monitoring of the contended lock may include monitoring of the lock address of the lock to determine whether the lock has become available for the first processor {Monitor(N.lock)}. According to one embodiment, setting up the monitor may include activating the monitor in response to the front end 365 receiving a MONITOR opcode, and the front end 365 generating a special monitor uOP. The monitor uOP may be passed to the execution resources 370. The monitor uOP may have an associated address indicating the address to be monitored (the monitor address). According to one embodiment, the monitor address may include the lock address of the lock to which the node may be linked. The associated address may "indicate" the monitor address in that it may convey enough information to determine the monitor address (possibly in conjunction with other registers or information).

As illustrated in FIG. 3, according to one embodiment, the monitor address may be provided to the address translation logic 375 and passed along to the monitor, where it may be stored in a monitor address register 335. In response to the MONITOR opcode, the execution resources 370 may then enable and activate the monitor as indicated in processing block 510 and further detailed in FIG. 6. According to one embodiment, the monitor may continue to operate in parallel with other operations until a monitor event occurs once it is activated by the MONITOR opcode according to one embodiment.

At processing block 816, according to one embodiment, memory wait (mwait) instruction may be executed to put the processor to sleep while waiting for the contended lock to become available. According to one embodiment, MWAIT opcode may be received and passed to execution. According to one embodiment, execution of the MWAIT opcode may unmask various monitor events. In response to the MWAIT opcode, a test may be performed to determine whether a monitor event is pending. If no monitor event is pending, then a test may be performed to determine whether the monitor is active. For example, if MWAIT is executed without previously executing a MONITOR, the monitor may not be active. According to one embodiment, if either the monitor is inactive or a monitor event is pending, then processor may not put to sleep. According to one embodiment, the monitor event may refer to an event upon the occurrence of which, the monitor may go inactive ending the monitoring of the node and the processor may be awakened. For example, a monitor event may include the processor reaching its turn to claim the ownership of the lock and/or the lock become available to the processor when released by another processor currently owning the lock.

According to one embodiment, the processor may be put to sleep using the monitor-mwait mechanism on the node at processing block 818. According to one embodiment, if the monitor is active and there is no pending monitor event, the processor may be put to sleep until the monitor event occurs. Stated differently, the first processor may sleep until, for example, the processor is recognized to be the first processor in line to claim the ownership of the contended lock. Such recognition may be referred to as the occurring of the monitor event making the monitor inactive and waking up the processor at processing block 820.

According to one embodiment, a monitor event may not be limited to one event, and various events may be tested to determine whether monitoring may be ended the processor may be awakened. As discussed with respect to FIG. 6, the monitor itself may check whether a monitor event has occurred and so indicate by setting an event pending indicator. The event pending indicator may be provided via an EVENT signal to the processor sleep/awake logic 377 (e.g., microcode). Microcode may recognize the monitor event at an appropriate instruction boundary, according to one embodiment, since this event may have been unmasked by the MWAIT opcode. Furthermore, event detect logic 345 may be used to detect various events that are designated as monitor events. Furthermore, according to another embodiment, an optional timer may be used periodically to exit the mwait state to ensure proper workings of the hyperthreaded processor, and to check on some particular sequence of events that may cause the hyperthreaded processor to freeze. If none of these events signal an exit to the mwait state, then the first processor may remain asleep.

At processing block 822, the first processor, now awaken, may claim the ownership of the lock and may also reclaim any previously relinquished resources. Previously relinquished resources may refer to the resources relinquished by the first processor while asleep and waiting for the lock. According to one embodiment, while the processor sleeps, the processor sleep/awake logic 377 may include pipeline flush logic 382 to drain the processor pipeline in order to clear all instructions at processing block 530. Once the pipeline has been drained, partition/anneal logic 385 may cause any partitioned resources associated exclusively with the first processor to be relinquished for use by other processors. These relinquished resources may be annealed to form a set of larger resources for other processors to utilize. For example, referring to the two-thread example of FIG. 4, all instructions related to thread 1 might be drained from both queues. Each pair of queues may then be combined to provide a larger queue to the second thread. Similarly, more registers from the register pool may be made available to the second thread, more entries from the store buffer may be freed for the second thread, and more entries in the re-order buffer may be made available to the second thread. In essence, these structures are returned to single dedicated structures of twice the size. Different proportions resulting from implementations using different numbers of processors are contemplated.

According to one embodiment, once the first processor wakes up or resumes, the processor sleep/awake logic 377 may again be activated upon detection of the monitor event. Again, the pipeline may be flushed to drain instructions from the pipeline so that the previously relinquished resources can be once again partitioned to accommodate the soon-to-be-awakened or recently-awakened first processor.

Figure 9:
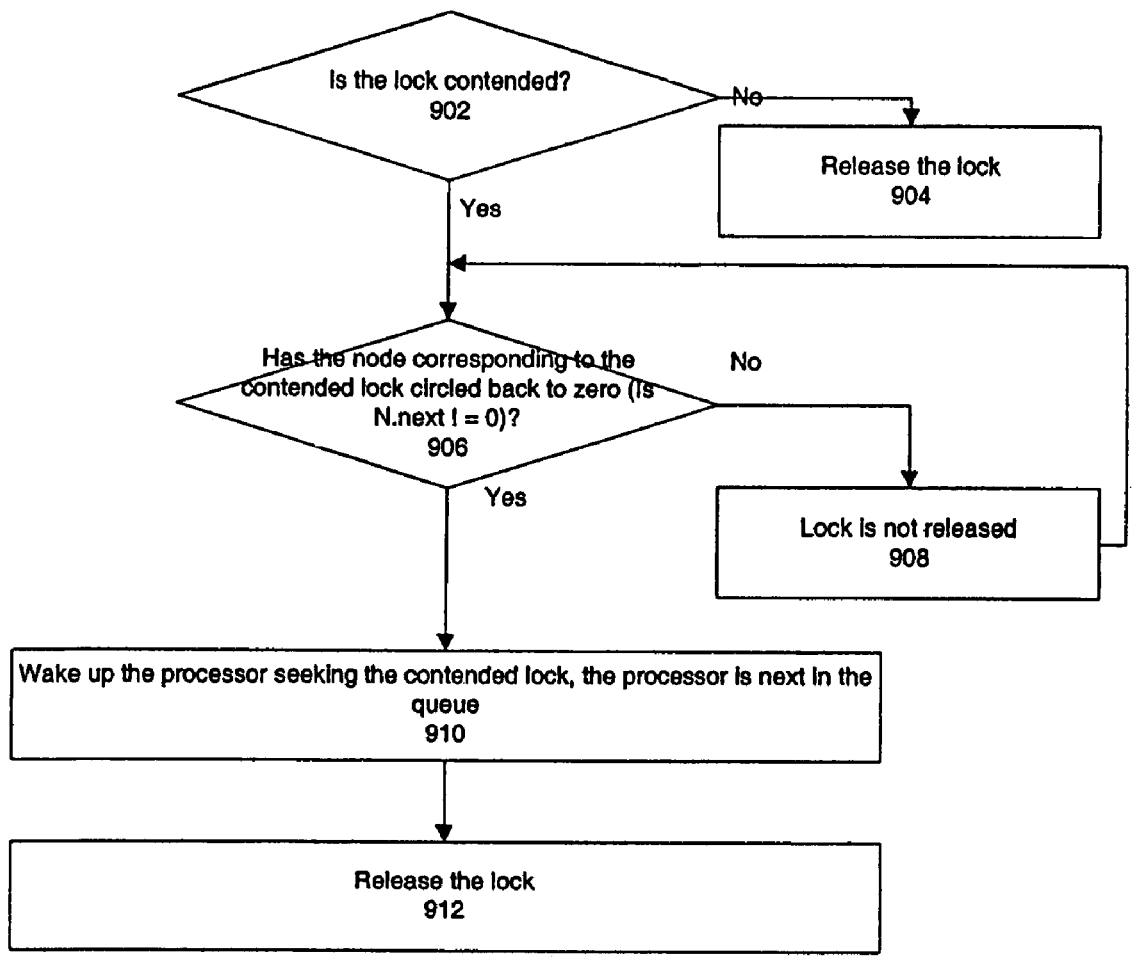
FIG. 9 is a flow diagram illustrating an embodiment of a process for releasing a lock and monitoring the lock using monitor-memory wait.

FIG. 9 is a flow diagram illustrating an embodiment of a process for releasing a lock and monitoring the lock using monitor-memory wait. As described with reference to FIG. 8, according to one embodiment, monitor-memory wait (monitor-mwait) may be used to monitor a contended lock by monitoring the corresponding queue element or node (node), such as node N, and to put the processor seeking the contended lock to sleep until, for example, the contended lock become available. Using monitor-mwait with regard to releasing of a lock, at decision block 902, whether the lock is contended is determined. If the lock is not contended, the lock may be released at processing block 904. However, if the lock is contended, the releasing of the lock may not occur until, for example, the processor (releasing processor) owning the lock releases the lock in response to one or more events including one or more monitor event.

According to one embodiment, a monitor event may refer to the processor (sleeping processor) seeking the lock being the next (or first) in line to claim the contended lock. For example, the releasing processor may issue a store the N.next→Lock to wake up the sleeping processor seeking the contended lock from sleep/mwait ((If (N.next!=0) {Store to N.next→lock//waking up the sleeping processor}) as described in the acquired phase with respect to FIG. 8. Stated differently, at decision block 906, whether the node has reached (or circled back to) zero (0) is determined. If the node has reached zero, i.e., N.next!=0, the releasing processor may issue a store N.next→Lock that the sleeping processor is next in line to own the lock, and the sleeping processor is awakened from sleeping at processing block 910. If the node has not reached zero, the lock may not be released at processing block 908. At processing block 912, the lock is released by the releasing processor. According to one embodiment, any store operations that occur after the MONITOR opcode may be fenced to ensure that stores may be processed and detected. According to one embodiment, some operations may need to occur as a result of activating the monitor before any subsequent instructions can be undertaken, or may occur in parallel with other operations until a monitor event occurs once it is activated by the MONITOR opcode.

Figure 10:
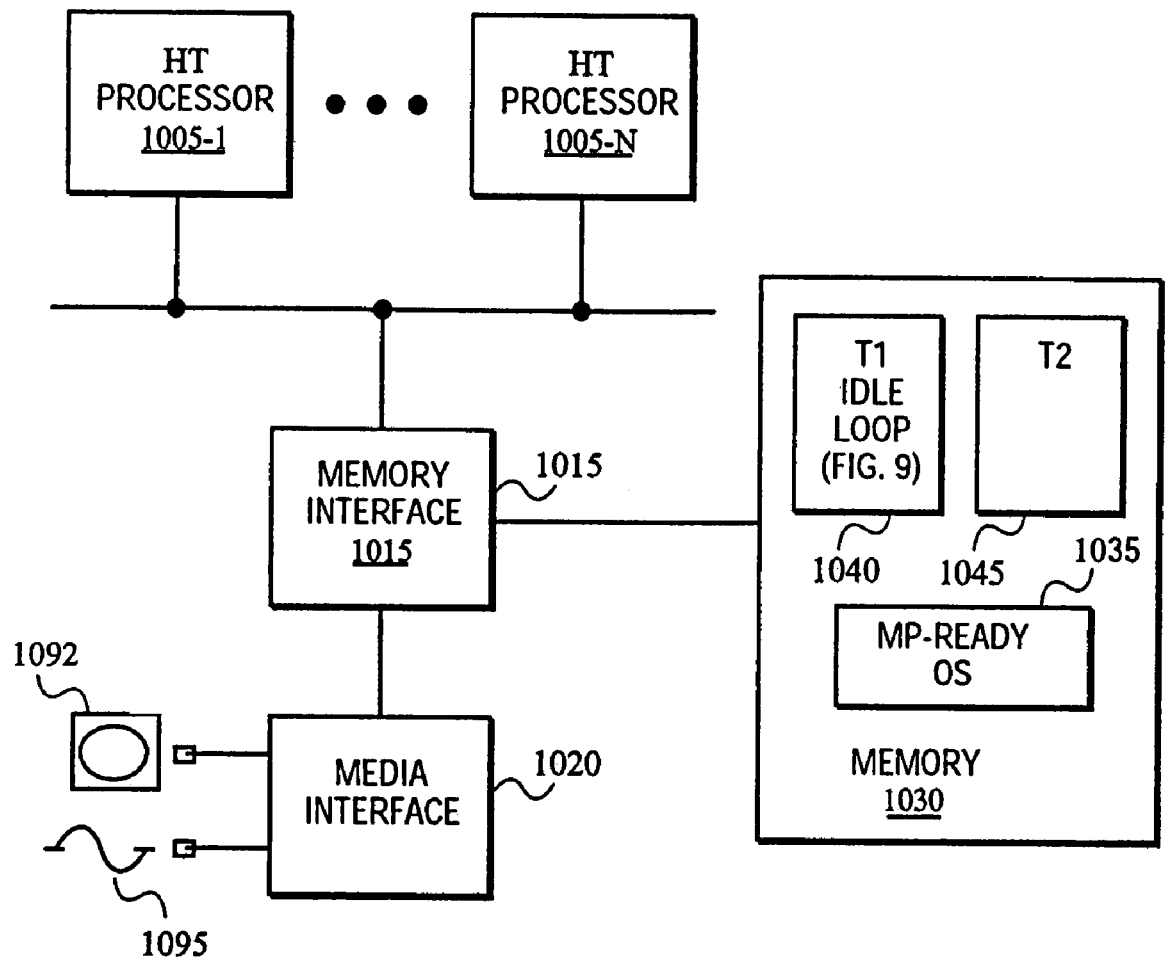
FIG. 10 is a block diagram illustrating an embodiment of a system.

FIG. 10 is a block diagram illustrating an embodiment of a system. According to one embodiment, as illustrated, the system includes a set of N hyperthreaded processors, processors 1005-1 through 1005-N. The hyperthreaded processors 1005-1-1005-N are coupled with a bus 1050. According to another embodiment, a single processor or a mix of hyperthreaded processors and single-threaded processors may be used. Furthermore, other known or otherwise available system arrangements may be used. For example, the processors 1005-1-1005-N may be connected in a point-to-point fashion, and parts such as the memory interface may be integrated into each processor 1005-1-1005-N.

According to one embodiment, a memory interface 1015 coupled with the bus 1050 is coupled with a memory 1030 and a media interface 1020. The memory 1030 may include a multi-processing ready operating system 1035, and instructions for a first thread 1040 and instructions for a second thread 1045. The instructions 1030 may include an idle loop according to one embodiment.

According to one embodiment, the appropriate software to perform various functions or embodiments may be provided in any of a variety of machine-readable mediums. According to one embodiment, the media interface 1020 may provide an interface to such software.

According to one embodiment, the media interface 1020 may be an interface to a storage medium (e.g., a disk drive, an optical drive, a tape drive, a volatile memory, a non-volatile memory, or the like) or to a transmission medium (e.g., a network interface or other digital or analog communications interface). The media interface 1020 may read software routines from a medium (e.g., storage medium 1092 or transmission medium 1095). Machine-readable mediums are any mediums that may store, at least temporarily, information for reading by a machine interface. This may include signal transmissions (via wire, optics, or air as the medium) and/or physical storage media 1092 such as various types of disk and memory storage devices.

Figure 11:
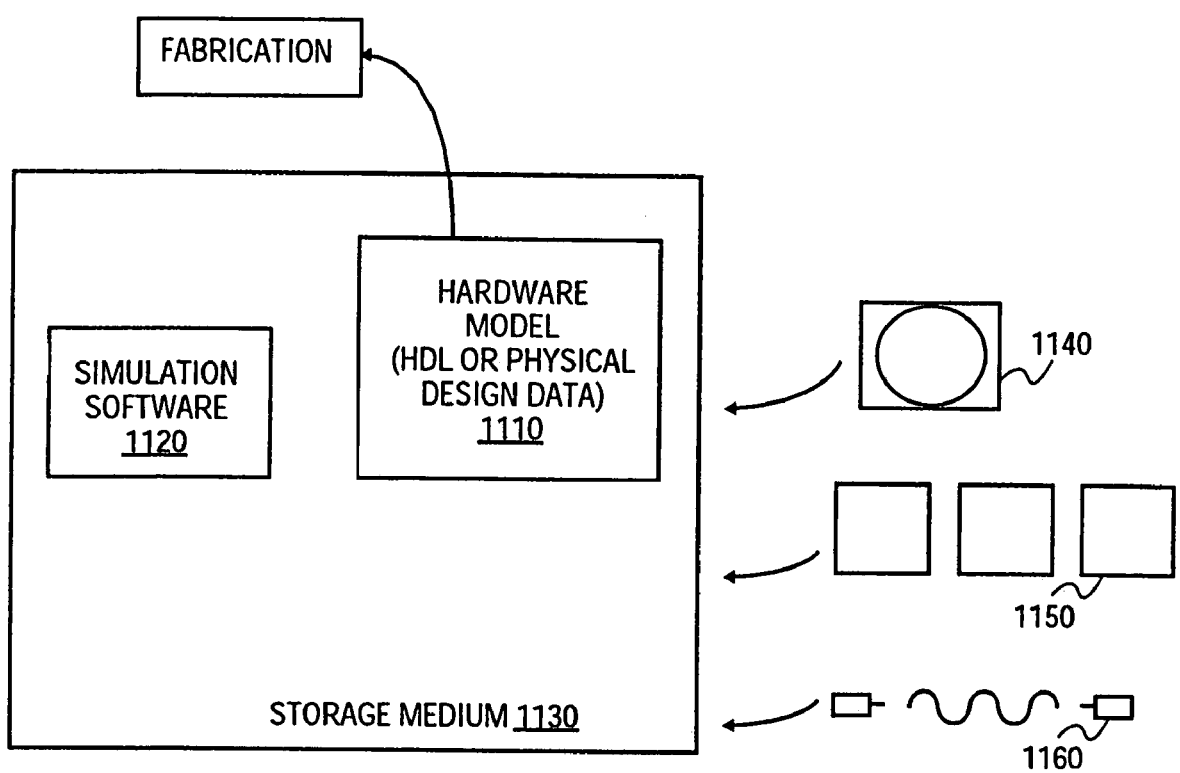
FIG. 11 is a block diagram illustrating an embodiment of various design representations or formats for simulation, emulation, and fabrication of a design.

FIG. 11 is a block diagram illustrating an embodiment of various design representations or formats for simulation, emulation, and fabrication of a design. Data representing a design may represent the design in a number of manners. First, as is useful in simulations, the hardware may be represented using a hardware description language or another functional description language which essentially may provide a computerized model of how the designed hardware is expected to perform. The hardware model 1110 may be stored in a storage medium 1100, such as a computer memory, so that the model may be simulated using simulation software 1120 that may apply a particular test suite 1130 to the hardware model 1110 to determine whether it is performing its intended function. According to one embodiment, the simulation software 1120 may not be recorded, captured, or contained in the medium.

According to one embodiment, a circuit level model with logic and/or transistor gates may be produced at some stages of the design process. Such model may be similarly simulated, sometimes by dedicated hardware simulators that form the model using programmable logic. This type of simulation, taken a degree further, may be an emulation technique. According to one embodiment, re-configurable hardware may involve a machine-readable medium storing a model employing the disclosed techniques.

Furthermore, according to one embodiment, most designs, at some stage, may reach a level of data representing the physical placement of various devices in the hardware model. Where conventional semiconductor fabrication techniques may be used, the data representing the hardware model may be the data specifying the presence or absence of various features on different mask layers for masks used to produce the integrated circuit. This data representing the integrated circuit may have the techniques disclosed in that the circuitry or logic in the data can be simulated or fabricated to perform these techniques.

According to one embodiment, the data may be stored in any form of a computer-readable medium. An optical or electrical wave 1160 modulated or otherwise generated to transmit such information, a memory 1150, or a magnetic or optical storage 1140 such as a disc may represent the medium. The set of bits describing the design or the particular part of the design may represent an article that may be sold in and of itself or used by others for further design or fabrication.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   causing a processor to exit a sleep state in response to an event, wherein exiting the sleep state comprises resuming control of processing resources that were relinquished by the processor during the sleep state; and
   disabling monitoring of a node associated with a contended lock after the processor exits the sleep state.

2. The method of claim 1, further comprising putting the processor to sleep until the event has occurred.

3. The method of claim 2, further comprising relinquishing resources when put to sleep.

4. The method of claim 3, wherein the relinquishing of the resources comprises:
   relinquishing of a plurality of registers in a register pool;
   relinquishing of a plurality of instruction queue entries in an instruction queue;
   relinquishing of a plurality of store buffer entries in a store buffer; and relinquishing of a plurality of re-order buffer entries in a re-order buffer.

5. The method of claim 1, further comprising reacquiring the relinquished resources.

6. The method of claim 1, further comprising forming larger resources for non-sleeping processors to utilize while the processor sleeps, the larger resources including the relinquished resources.

7. The method of claim 1, further comprising:
   monitoring the node associated with the contended lock; and
   identifying the processor while waiting for the contended lock.

8. An apparatus comprising:
   a first logic to cause a processor to exit a sleep state in response to an event, wherein exiting the sleep state comprises resuming control of processing resources that were relinquished by the processor during the sleep state; and
   a second logic to disable monitoring of a node associated with a contended lock after the processor exits the sleep state.

9. The apparatus of claim 8, wherein the first logic is further to put the processor to sleep until the event has occurred.

10. The apparatus of claim 9, wherein the processor to relinquish resources when put to sleep.

11. The apparatus of claim 10, wherein the relinquishing of the resources comprises:
    relinquishing of a plurality of registers in a register pool;
    relinquishing of a plurality of instruction queue entries in an instruction queue;
    relinquishing of a plurality of store buffer entries in a store buffer; and
    relinquishing of a plurality of re-order buffer entries in a re-order buffer.

12. The apparatus of claim 8, wherein the second logic is further to reacquire the relinquished resources.

13. The apparatus of claim 8, wherein the second logic is further to form larger resources for non-sleeping processors to utilize while the processor sleeps, the larger resources including the relinquished resources.

14. The apparatus of claim 8, further comprising a third logic to:
    monitor the node associated with the contended lock; and
    identify the processor while waiting for the contended lock.

15. A tangible machine-readable storage medium comprising instructions which, when executed, cause the machine to:
    cause a processor to exit a sleep state in response to an event, wherein exiting the sleep state comprises resuming control of processing resources that were relinquished by the processor during the sleep state; and
    disable monitoring of a node associated with a contended lock after the processor exits the sleep state.

16. The tangible machine-readable storage medium of claim 15, wherein the instructions which when executed, further cause the machine to put the processor to sleep until the event has occurred.

17. The tangible machine-readable storage medium of claim 16, wherein the instructions which when executed, further cause the machine to relinquish resources when put to sleep.

18. The tangible machine-readable storage medium of claim 17, wherein the instructions when executed to relinquish the resources, further cause the machine to:
    relinquishing of a plurality of registers in a register pool;
    relinquishing of a plurality of instruction queue entries in an instruction queue;
    relinquishing of a plurality of store buffer entries in a store buffer; and
    relinquishing of a plurality of re-order buffer entries in a re-order buffer.

19. The tangible machine-readable storage medium of claim 15, further comprising reacquiring the relinquished resources.

20. The tangible machine-readable storage medium of claim 15, wherein the instructions which when executed, further cause the machine to form larger resources for non-sleeping processors to utilize while the processor sleeps, the larger resources including the relinquished resources.

21. The tangible machine-readable storage medium of claim 15, wherein the instructions which when executed, further cause the machine to:
    monitor the node associated with the contended lock; and
    identify the processor while waiting for the contended lock.

* * * * *